United States Patent [19]
Michaelson

[11] Patent Number: 5,089,287
[45] Date of Patent: Feb. 18, 1992

[54] ANIMAL AND FOWL FEED SUPPLEMENT AND METHOD OF MANUFACTURE

[75] Inventor: Joseph B. Michaelson, Los Angeles, Calif.

[73] Assignee: Control Feeds, Inc., Parker, Colo.

[21] Appl. No.: 419,470

[22] Filed: Oct. 10, 1989

[51] Int. Cl.<sup>5</sup> ............................................. A23K 1/04
[52] U.S. Cl. ................................... 426/647; 426/74; 426/302; 426/519; 426/521; 426/805; 426/807
[58] Field of Search ................ 426/647, 74, 519, 641, 426/521, 626, 302, 805, 807

[56] References Cited

U.S. PATENT DOCUMENTS

| | | | |
|---|---|---|---|
| 2,739,063 | 3/1956 | Wehrmeister | 99/2 |
| 2,965,488 | 12/1980 | Belasco | 99/2 |
| 3,078,164 | 2/1963 | de Lisle | 99/2 |
| 3,130,054 | 4/1964 | Parker | 99/2 |
| 3,244,527 | 4/1966 | Baker | 99/2 |
| 3,271,161 | 9/1966 | Eshleman | 99/4 |
| 3,352,685 | 11/1967 | Hess | 426/647 X |
| 3,539,685 | 11/1970 | de Lisle | 424/127 |
| 3,617,298 | 11/1971 | Kohl | 99/2 |
| 3,767,416 | 10/1973 | Lee | 426/807 X |
| 4,219,586 | 8/1980 | Parks | 426/647 |
| 4,610,814 | 9/1986 | Dede et al. | 426/647 |
| 4,666,725 | 5/1987 | Yamashita et al. | 426/647 |
| 4,729,902 | 3/1988 | Urman et al. | 426/647 |
| 4,824,679 | 4/1989 | Freeman | 426/656 |

Primary Examiner—R. B. Penland
Attorney, Agent, or Firm—Warren F. B. Lindsley

[57] ABSTRACT

An animal and fowl feed supplement and method of manufacture wherein whole slaughterhouse blood is coagulated and centrifuged to provide a blood meal and a resulting liquid serum wherein the blood is blended and treated with the resulting liquid serum and acid to control its pH rating and this blended blood concentrate is then mixed with diatomaceous earth in a given ratio to provide the food supplement.

11 Claims, 1 Drawing Sheet

ANIMAL AND FOWL FEED SUPPLEMENT AND METHOD OF MANUFACTURE

BACKGROUND OF THE INVENTION

This invention is an improvement over U.S. Pat. No. 4,729,902 granted March 8, 1988 entitled "ANIMAL AND FOWL FOOD SUPPLEMENT AND PROCESS OF MANUFACTURE" and relates to a comestible product and more particularly to a unique high quality protein adjuvant for the animal and fowl feed industry.

In the formulation of animal and poultry feed it is frequently desirable to include as components, materials which have peculiar and distinctive nutritional properties or flavor appeals but whose incorporation in the formulated feed presents problems in achieving uniform and effective distribution throughout the relatively dry feed masses which comprise normal or specific animal and fowl rations. This is particularly true of those feed stuff components or ingredients which are normally in liquid form and which, because of their indigenous hygroscopic character do not permit of their ready drying and subsequent dry storage under normal variated temperature and relative humidity conditions.

Many animal feed millers confine their formulations to the use of normally dry components inasmuch as special equipment and skill is usually required in order to introduce wet material into dry animal feeds and to distribute them uniformly while avoiding overheating, molding, spontaneous combustion and related spoilage manifestations in the resulting comestible mixtures. For this reason, feed millers customarily purchase what are known as feed concentrates or pre-mixes for addition to, and for admixture with, the basic dry grains or meals which constitute the greater proportion of the finally formulated feed.

To this end, an improved fowl feed product and process of manufacture is provided a feed miller which combines a rendering plant's slaughterhouse blood comprising substantially 25 to 55 percent solids, for example, with a high silicon grade diatomaceous earth having a high adsorbancy and high surface area, and a particle size of between 200 and 400 mesh.

With increased awareness by the scientific community of the need for balanced animal nutrition, slaughterhouse blood is becoming increasingly important as a uniform high quality protein adjuvant to the animal and fowl feed industry.

Properly processed blood can supply many of the essential amino acid building blocks for growing animals not found in appreciable quantity in the feed grains. The specific amino acids found in blood having the greatest interest are lysine, tryptophan, methionine and threonine. It has been found, with some animal groups, that lower protein rations with balanced amino acids, including increased lysine levels, produced better results than high protein diets.

Historically, blood is prepared by drying with a wide range of these amino acid groups biologically available. Technology in drying blood, in recent years, has not made many new advances over the steam drying method and ring flash dryer of the prior art. The ring flash dryer produces a high quality product of high biological retention of the critical amino acids, but at the sacrifice of product cost due to a high energy demand to produce the product.

Seven to ten tons of raw mammal blood (depending on percentage of blood solids) are required to produce one ton of ring dried blood. In this process, raw blood is coagulated by steam, centrifued to dewater to 40 to 50 percent blood solids, then passed through the high temperature ring dryer by air entrainment. The product produced is used primarily to enhance the protein value of other supplemental feed products.

DESCRIPTION OF THE PRIOR ART

Although blood has been prepared and used as a feed supplement, the wide differences in the available amino acid groups in the resulting product and the high energy cost of the drying cycle needed to produce the blood has left room for improvement not only in the product but also in the cost of producing it.

Diatomaceous earth has been used in small quantities in poultry feed as evident from U.S. Pat. No. 3,271,161 to increase egg production and to promote growth.

U.S. Pat. No. 3,539,685 teaches the use of diatomaceous earth to eliminate worms from infected animals.

U.S. Pat. No. 3,617,298 teaches the coating of a nitrogenous source material with a coating of diatomaceous earth and then with a palate inducing material to retard the release of nitrogen with the livestock.

U.S. Pat. No. 3,078,164 describes a method for the extraction of nutrients from such dilute solutions as raw whey. This patent teaches the repeated steps of combining controlled amounts of the dilute solution with a pulverulent absorptive infusible solid such as diatomaceous earth followed by a drying process.

U.S. Pat. No. 3,130,054 discloses a method of producing a food supplement composed of animal and/or vegetable tissues, exudates, sera, extracts and the like integrated with a sponge-like material such as exfoleated or expanded vermiculite.

U.S. Pat. No. 2,965,488 discloses ruminant feed compositions comprising urea, natural protein, carbohydrates and various additives.

U.S. Pat. No. 2,739,063 discloses a bacitracin feed supplement absorbed on an activated clay wherein the pH of a fermentation liquor is controlled.

U.S. Pat. No. 3,244,527 discloses a cattle feeding process, compositions and product wherein a chemically inert amorphous silica particle of a size between $-10$ and $+50$ mesh is used.

None of these patents as well as others known to the inventor including technical publications teach the process and resulting product disclosed and claimed herein wherein slaughterhouse blood solids are combined with a high silicon grade diatomaceous earth having a high adsorbancy and high surface area with a particle size between 200 and 400 mesh to provide an animal and fowl feed supplement.

SUMMARY OF THE INVENTION

In accordance with the invention claimed, a new and improved product and method of manufacture is provided for the conversion of slaughterhouse blood into a useful and commercially feasible animal and fowl food supplement.

It is, therefore, one object of this invention to provide a new and improved article and method of manufacture for the conversion of slaughterhouse blood into an animal and fowl food supplement or feed additive.

Another object of this invention is to provide a method in a form that is commercially feasible with existing equipment such that the price commanded by the end product substantially exceeds production costs and the costs of competitive feed supplements.

A further object of this invention is to provide a method utilizing diatomaceous earth as an adsorptive solid for blood meal, a slaughterhouse by-product.

A still further object of this invention is to provide a method for producing an animal and fowl food supplement using blood and/or blood meal and a suitable grade of calcined and uncalcined diatomaceous earth as the basic raw materials.

A still further object of this invention is to provide such a method that limits processing time and costs by eliminating the high temperatures of the prior art necessary to totally lysis blood cells to destroy any fungus and bacteria organisms therein.

A still further object of this invention is to provide an alternate method of treating blood meal with an acid solution treatment to avoid the need for the high temperature treatment of the prior art.

A still further object of this invention is to provide such a method which limits processing time and temperatures to a sufficiently low level as not to degrade the nutritional value of the end product.

A still further object of this invention is to provide a method utilizing diatomaceous earth as an adsorptive solid for a blood product wherein the liquid serum of the blood is mixed with acid solution of the process to utilize inter alia the serum's nutritional systems including proteins, enzymes, lipids, carbohydrates, etc.

Yet another object of this invention is to provide a method of utilizing diatomaceous earth as an adsorptive solid for slaughterhouse blood wherein freeze or spray dried slaughterhouse blood is acidified and mixed with diatomaceous earth to prevent enzyme loss normally occurring in the prior art discarded serum.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
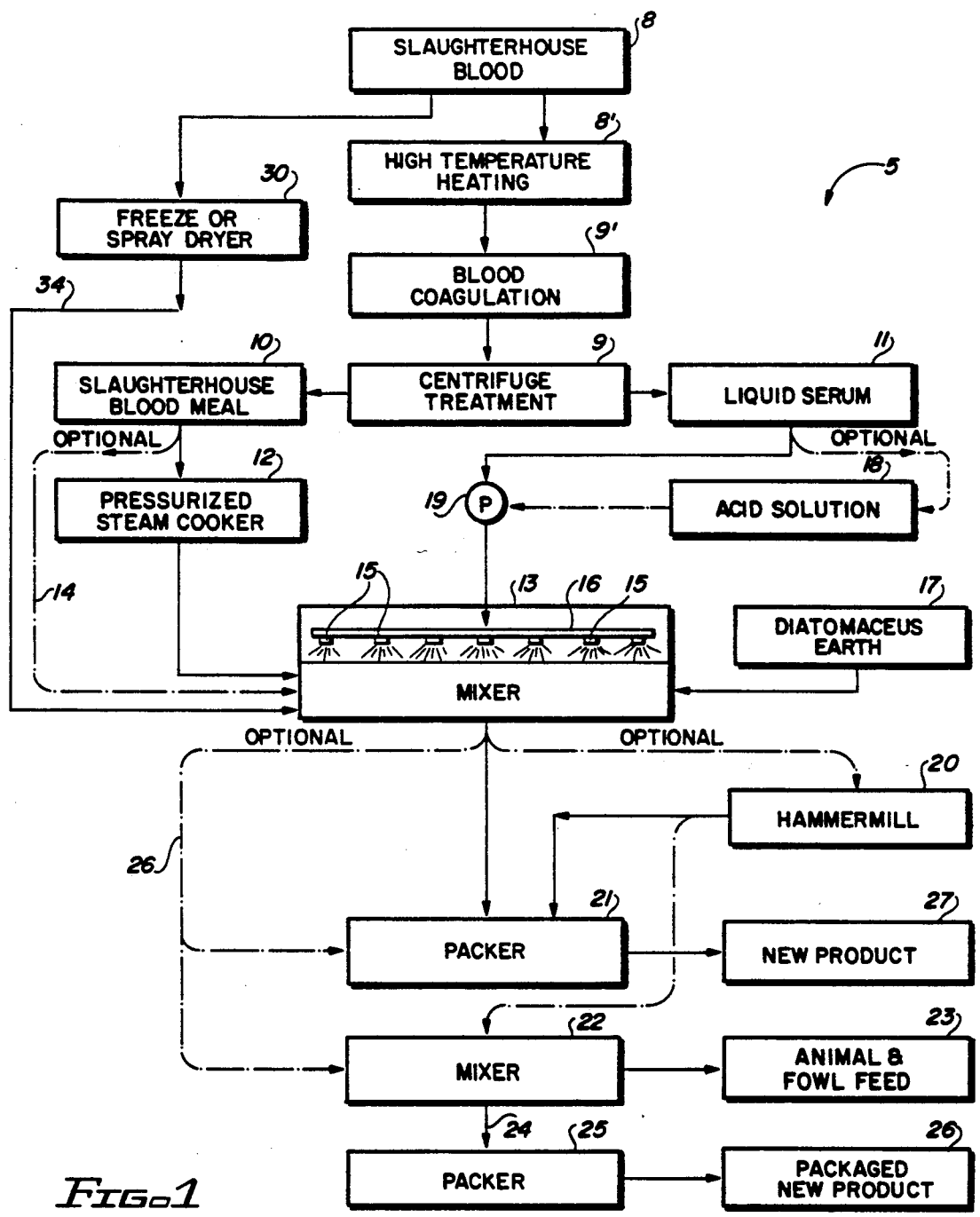
FIG. 1 is a diagrammatic representation of the process of the invention.

Referring more particularly to the drawing by characters of reference, FIG. 1 discloses a new and improved process and resulting product which combines a rendering plant's blood solids containing, for example, from 25 to 55% total solids, with a high silicon grade diatomaceous earth having a high adsorbancy rate and high surface area with a particle size, for example, between 200 and 400 mesh.

The slaughterhouse blood can be derived from any mammalian animal source which may be cooked under pressure for a short period of time to ensure total lysing of the blood cells and to destroy contaminating bacteria.

The diatomaceous earth is a deposit of shells of unicellular plants; i.e., the diatoms which are microscopic, aquatic, single-celled algae which are found both in the sea and in fresh water lakes and ponds. The individual diatom consists of a living cell enclosed by two half-cell walls which are called valves. The diatoms extract silica from their environment and deposit it in the valves. When the diatom dies, it sinks to the bottom of the body of water and the organic matter is decomposed, leaving the hard siliceous shell or valves. Constant leaching over thousands of years has eliminated most of the extraneous material so that the deposits of diatomite, made up of great numbers of these diatom valves, are relatively pure.

Diatomaceous earth is mined in California, Oregon, Washington, Nevada and Arizona. It has many commercial uses, one of the most commonly known being as a filtering material as employed, for example, in swimming pool filters. In the case of the filtering application, the diatomite is first burned or calcined to convert the various chemical constituents into oxides which are not digestible. In the use defined by the present invention, the uncalcined product is preferably employed which includes digestible carbonates and other minerals of importance in animal diets.

While numerous mining operations exist in the areas referenced, very few deposits exist in the U.S. in which the contents of heavy metals and other contaminants are less than the maximum permissible level for animal consumption as stipulated by the National Academy of Sciences. Typical specifications for this material are as follows:

Silica derived from diatoms: 80–92%

Dry density (pounds/cubic food): 8–20

Particle size (microns): 0.1–44

Water adsorption (g/100 g of diatomaceous earth): 100–200

Trace mineral content within acceptable levels as stipulated by National Academy of Sciences As set forth and claimed in U.S. Pat. No. 4,729,902, referred to above, the method of converting a moist concentrate into an animal and fowl food supplement comprised the steps of acidifying a blood concentrate with an acid solution. In this process whole blood is subjected to high temperatures with the blood proteins coagulating and becoming insoluble forming what is known as blood meal. This blood meal is centrifuged off and the resulting liquid serum is discarded.

This discarded liquid serum contains nutritional enzymes, lipids, carbohydrates, etc. which according to the invention claimed herein is recaptured and added to the acid used for the acidification of the final blood product, thereby restoring these previously lost nutrients.

As shown in FIG. 1, a new and improved process 5 is disclosed comprising the step of subjecting whole slaughterhouse blood 8 to a high temperature at 8' with the blood proteins coagulating at 9' and becoming insoluble and centrifuged off at 9 as a slaughterhouse blood meal 10 hereinafter called blood meal with the resulting separated liquid serum 11 being separated from the blood meal and later optionally mixed with an acid solution 18. The liquid serum 11 as shown is either pumped directly to mixer 13 or optionally treated with acid solution 18 and then transmitted to mixer 13 by pump 19.

The blood meal 10 which contains from 25 to 55 percent total solids may be cooked in a standard industrial steam cooker 12 which is pressurized to approximately 30 psi steam pressure for approximately 15 to 30 minutes. This procedure totally lysis any remaining blood cells to expose interior moisture and destroys all fungus and bacteria organisms thereby serving as a sanitizing procedure. It should be noted that this pressurized steam cooking of the blood meal is an optional step since the total lysing of the blood meal and destruction of the contained microorganisms would occur in a later described acid treatment of the mixed diatomaceous earth and the blood meal 10.

For purposes of this disclosure, raw slaughterhouse blood is coagulated and centrifuged to approximately 50 percent solids to provide the blood meal 10.

With reference to FIG. 1, blood meal 10 is either cooked in the pressurized steam cooker 12 and then transmitted to a high speed blending mixer 13 or transmitted directly to mixer 13 from the source of the blood meal 10 as indicated by the dash flow line 14. In mixer 13 blood meal 10, which now has the consistency of wet coffee grounds, is fine mist sprayed with an acid solution by nozzles 15 of a pressure line 16 positioned within mixer 13 as shown in the drawing.

Mixer 13's pressure line 16 and its associated nozzles 15 provide for the mixing of a liquified material; i.e., liquid serum 11 or optionally acid solution 18, with the blood meal prior to the introduction in the mixer of a diatomaceious earth 17. Pipe line 16 and its associated jets or nozzles 15 are merely one example of a means for spraying the liquid serum directly and/or with an acid solution on the mixing blood meal. Other forms of acid treatment may be used and fall within the scope of this invention.

Mixer 13 may be a paddle type wherein particulate material is continually circulated throughout a chamber. The mixer blends or mixes the blood meal 10, which may be optionally first sprayed with an acid solution, with a relatively dried particulate diatomaceous earth 17 in the particular sequence described to cause an intimate blending thereof.

As shown in the drawing, the liquid sprayed on the mixing blood meal in mixer 13 may comprise an acid solution 18 which is pumped into pipe line 16 and through nozzles 15 in a jet-like manner by pump 19. As will be appreciated, a controlled amount of acid is fed into mixer 13 to reduce the pH of the total mass of blood meal to an acid pH rating of less than 2, including such low pH rating as 0.1, thereby serving as a sanitizing agent.

As mentioned above acid solution 18 comprises an acid diluted at least in part by the liquid serum 11 derived from the whole slaughterhouse blood 8.

A variety of acids at different strengths can be used; however, for many reasons, hydrochloric acid, being compatible with a feeding animal's digestive system, is used in this example. The dilution of acid again is determined for the purpose of this example to be approximately 10 percent by weight aqueous solution of hydrochloric acid. Other dilutions of acid varying from 5 to 50 percent can also be used. At the end of this acid solution treatment of the process disclosed, all organisms found as contaminants in blood are destroyed and the blood mass is rendered harmless against any organism growth from outside recontamination. The acid has now also begun to alter the crude protein of the blood meal from long chain molecules into shorter chain amino acid molecules making their nutritive value more quickly available to a feeding animal.

After the acid treatment of the blood, the diatomaceous earth 17 is introduced into mixer 13 in the proper weight ratio and the total mass is allowed to mix thoroughly. Such a predetermined ratio may be, for example, a one-to-one, one-to-two or one-to-three ratio by weight. Mixing is accomplished very easily; the dry diatomaceous earth has a natural affinity to the high moisture blood mass, coating each blood particle with an adsorbing insulating cover. The acidified blood serum is adsorbed into the diatom where the moisture level of the total mass finds an equilibrium. The diatomaceous earth being a neutral adsorbant and the blood mass having a pH of about 2, the total mixture of the product that has passed through the pressurized steam cooker 12 now has a pH of less than 3 and may be as low as 0.1, sufficient in acidity to discourage new bacteria growth, yet not excessive to a feeding animal when fed at an already approved feed ratio not exceeding 3 percent of total dry ration.

In the case of blood meal not run through the pressurized steam cooker 12, the pH of the blood is adjusted to arrive at a finished product comprising blood meal and diatomaceous earth approximately of a pH rating of 2.

The next step in the process procedure, which may be optional, is to run the total product mass through a hammermill 20 of determinate screen size to break up any overly large blood particles to a more uniform size. Again, as blood particle surfaces are exposed by milling, there is the immediate recoating of the surfaces with the diatomaceous earth and more thorough mixing is accomplished. The product is now ready for the bag plant packer 21, transport storage, or admixing in mixer 22 with other meat, bone or other animal by-products 23 to formulate other new nutritionally balanced animal feed products 24 which are packaged by packer 25 as packaged new product 26.

As evident by the dash line 26', the blood meal 10 optionally acid treated and the diatomaceous earth mixture from mixer 13 may be transmitted directly to packer 21 and/or mixer 22. From packer 21 it may be packaged as new product 27 and/or from mixer 22 it may be mixed with the animal and fowl feed 23 without going through the hammermill 20.

Exhaustive bacterialogical testing has concluded the new product to have a bacteria individual count of zero over at least 30 days of incubation. At the pH levels used in the disclosed sample, the soil-borne bacteria introduced to the blood from the diatomaceous earth was also rendered to no growth. As most animal by-products are utilized by the feed industry quickly, further sanitization of diatomaceous earth is not required however, if because of some microorganism problems occurring, a form of diatomaceous earth known as "calcined" (flash burned at 1200° to 1300° F. to reduce carbonates to oxides) eliminates fungus and is available in the marketplace for use.

In accordance with the invention disclosed and claimed, a new process and resulting product is provided which uses the same amount of raw blood input to produce six times the amount of new product than the ring dried product of the prior art while reducing the energy demand by not needing the blood drying functions of the prior art and thus greatly reduces the manufacturing costs per ton of the resulting feed supplement.

Extensive culture tests have determined the claimed stabilized product to be immune to outside bacterial contamination as well as interior bacteria growth which causes decomposition or denitrogenation of the proteins therein, thereby giving the claimed product a reasonable storage life before incorporating it into an integrated feed mix, with no extraordinary precautions necessary.

In addition, the stabilization phase of the claimed process enhances the biological availability of the amino acid groups resulting from a breaking down of the long chain molecules of crude blood protein into shorter chain amino acids or, in other words, a "predigestion" is occurring.

The blood serum which is retained by adsorption into the diatom contributes an approximate 5 to 20 percent crude protein retention efficiency over the flash dried blood mean of the prior art.

The diatomaceous earth, in addition to its main function of an increased contact utilizer between digestive enzymes and amino acids by adsorption, encapsulates and insulates the blood solid particles, giving the new produce excellent handling and mixing capabilities.

The resulting product from the new process disclosed results in the following advantages over prior art products.

1. Energy costs reduced by eliminating drying process.
2. Blood serum nutrients retained.
3. Decomposition of resultant product to make it resistant against bacterial contamination and breakdown.
4. "Pre-digestion" of crude protein contained in product for faster utilization.
5. Improved handling (anti-caking) and mixability characteristics.
6. Mixable with other meat by-product supplements to balance amino acid and moisture percentages.
7. Increased protein utilization of entire feed ration.
8. Fly-odor control in manures.
9. Trace mineral availability in chelates form.
10. Totally natural product.
11. Meets AAFCO and FDA requirements up to 3% of total dry ration.
12. Six times product production from same input of raw blood, giving many options for other new feed supplement mixes.

As further noted from FIG. 1, the whole slaughterhouse blood may be frozen or spray dried in dryer 30 and fed directly through line 34 into mixer 13.

It is admitted that when blood is heated to high temperatures the blood coagulates with some enzyme activity in the serum being lost. To overcome this loss it is disclosed that the whole blood can be either frozen or spray dried which would provide 100 percent of all the nutrient factors in the animal/fowl feed supplement disclosed herein. The blood proteins would be in a "Native" state and not denatured which alters the solubility and molecular configurations of the blood product.

Figure 2:
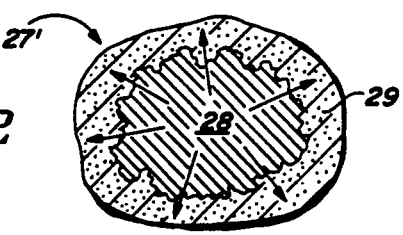
FIG. 2 is a schematic elevational view, greatly enlarged, showing a particle of the new food supplement.

FIG. 2 illustrates, in an exaggerated schematical form, a single product article 27' produced in accordance with the principles of the invention. A centralized acidized blood meal particle 28 is provided with a covering of diatomaceous earth 29 into which is adsorbed blood serum from the blood meal particle 28 where the moisture level of the total mass finds an equilibrium. A plurality of such particles forming the new product disclosed is free-flowing, anti-caking, and stable over a wide variety of temperature and atmospheric conditions thereby suitable for long periods of storage and/or immediate use with or without the addition of other natural protein or nutrient sources. The finished product particles contain a limited amount of moisture and are relatively nonhydroscopic, allowing mixture thereof with various minerals and vitamins and/or other natural protein sources without encountering processing difficulties requiring expensive equipment.

An effective new process is disclosed which produces as an end product a valuable animal and fowl food or feed supplement in accordance with the stated object of the invention and, although but a few embodiments of the invention have been illustrated and described, it will be apparent to those skilled in the art that various changes and modifications may be made therein without departing from the spirit of the invention or from the scope of the appended claims.

What is claimed is:

1. A method of converting slaughterhouse blood into an animal and fowl food supplement comprising the steps of:

dewatering by centrifugal force a predetermined quantity of raw mammal blood to approximately 40 to 50 percent of its volume forming a moist coagulated blood concentrate of a predetermined moisture content and a remaining first liquid blood serum, mixing the moist blood coagulated concentrate in a mixer, treating the moist blood coagulated concentrate in the mixer with an acid solution comprising at least a part of said first blood serum to control its pH value to approximately 2, thereby forming an acidified product, said acidified product comprising a given solid particle content of approximately 40 to 70 percent and a second liquid blood serum formed by the treating of said first blood serum with said acid solution, and mixing together with the acidified product diatomaceous earth comprising diatoms in a predetermined ratio by weight with the acidified product until the diatomaceous earth adsorbs said concentrate and the second liquid blood serum is at least partially adsorbed into the diatoms with the pH value of a resulting food supplement approximately 2.

2. The method set forth in claim 1 wherein:
the acid solution comprises an aqueous solution comprising a concentration of approximately 5 to 50% by weight of hydrochloric acid.

3. The method set forth in claim 1 wherein:
the resulting food supplement has an acidity pH value of less than 2.

4. The method set forth in claim 1 wherein:
said diatomaceous earth comprises 80 to 92% of silica derived from diatoms, a density of between 8 and 20 pounds per cubic foot, a particle size of between 0.1 and .44 microns, a surface area of between 20,000 and 50,000 square meters per gram, blood serum adsorption of between 100 and 200 grams per 100 grams of diatomaceous earth and a trace mineral content.

5. The method set forth in claim 4 wherein:
the resulting food supplement has an acidity pH value of under 2.

6. The method set forth in claim 5 wherein:
the acid solution comprises an aqueous solution comprising a concentration of approximately 5 to 50% by weight of hydrochloric acid.

7. The method set forth in claim 5 wherein:
the pH value of the resulting food supplement is sufficient to ensure substantially total lysing of the blood coagulated concentrate and rendering the acidified food supplement incapable of microorganism growth.

8. The method set forth in claim 1 wherein:
said acidified product and said diatomaceous earth are mixed in substantially one-to-one ratio by weight.

9. The method set forth in claim 1 wherein:
said acidified product and said diatomaceous earth are mixed in a substantially one-to-two ratio by weight.

10. The method set forth in claim 1 wherein:
said acidified product and said diatomaceous earth are mixed in a substantially one-to-three ratio by weight.

11. A method of converting dried whole slaughterhouse blood into an animal and fowl food supplement comprising the steps of:

mixing the dry whole slaughterhouse blood in a mixer, treating the mixed whole slaughterhouse blood with an acid solution to control its pH value to approximately 2, thereby forming an acidified product, said acidified product comprising a given solid particle content of approximately 40 to 70 percent and a liquid blood serum, and mixing together with the acidified product diatomaceous earth comprising diatoms in a substantially one-to-one ratio by weight with the acidified product until the diatomaceous earth adsorbs the particles of the concentrate and the liquid blood serum is at least partially adsorbed into the diatoms until the pH value of the resulting food supplement is approximately 2.

* * * * *